March 15, 1949.　　　　R. E. BOOTH　　　　2,464,372
TORQUE MEASURING SCREW DRIVER
Filed Nov. 30, 1945
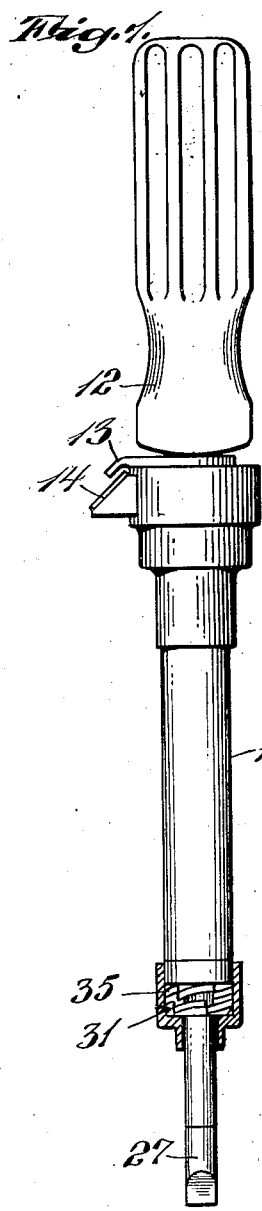
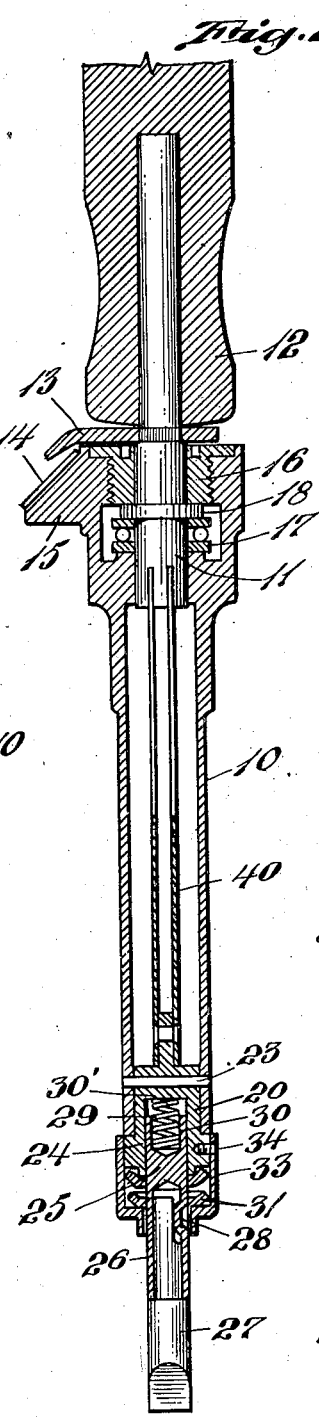
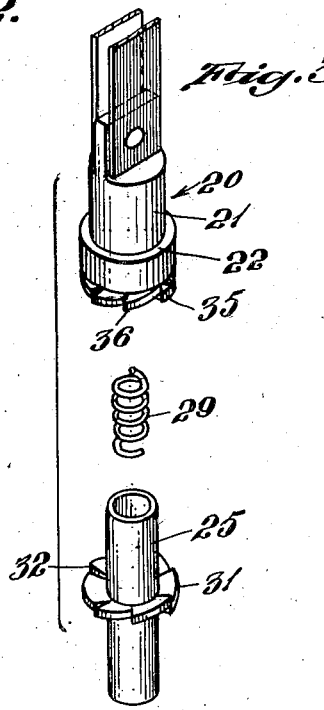
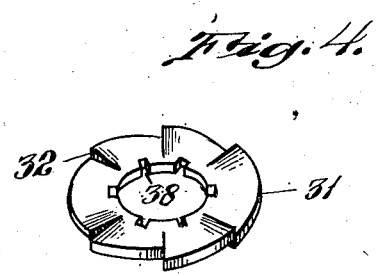
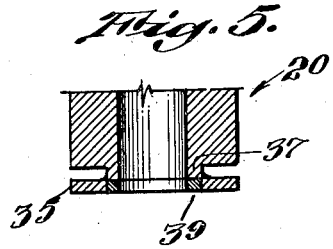
INVENTOR
Ralph E. Booth
BY Barlow & Barlow
ATTORNEYS Patented Mar. 15, 1949

2,464,372

UNITED STATES PATENT OFFICE 2,464,372

TORQUE MEASURING SCREW DRIVER

Ralph E. Booth, Mansfield, Mass., assignor to Apco Mossberg Company, a corporation of Massachusetts Application November 30, 1945, Serial No. 631,834

3 Claims. (Cl. 73—139)

This invention relates to a hand tool, more particularly to a tool which is twisted about its longitudinal axis for doing work at one end thereof, such as a screw driver.

In the usual torque screw driver there is provided some sort of scale over which a pointer works to indicate the torque which is applied to the work. It is usual that the graduations are in inch pounds. In a rotary instrument of this character there are some positions of rotation which provide a scale so that it may be easily viewed by the operator while there are other positions in which the scale is so located that it cannot be seen by the operator when the operator is in a normal working position.

One of the objects of this invention is to provide an arrangement so that the scale which is viewed in a torque tool of this character may always remain in view of the operator and the scale need never be twisted to a point so that it cannot be seen.

Another object of this invention is to provide an arrangement in a torque tool whereby the hand of the operator need not be removed from the handle to take a new grip thereon while operating the tool.

Another object of this invention is to provide a simple and efficient construction which may be easily and simply formed and easily assembled for completion of the tool.

With these and other objects in view the invention consists of certain novel features of construction as will be more fully described and particularly pointed out in the appended claims.

In the accompanying drawings:

Fig. 1 is an elevation of the tool with a part of the ratchet mechanism in section;

Fig. 2 is a sectional view of the tool throughout its length;

Fig. 3 is an exploded detail view showing the parts of the ratchet mechanism in perspective;

Fig. 4 is a perspective view of one of the ratchet discs;

Fig. 5 is a sectional view of a member with a ratchet disc mounted thereon.

In proceeding with this invention I provide a ratchet between the tool holder and the body of the tool, which body is operated through a torque mechanism. By this arrangement the body may be always maintained in substantially the same position of rotation so that the scale indication carried thereby will always be in a position so that it may be easily viewed. The ratchet mechanism may vary although I have provided a pair of discs with portions offset to provide teeth which will interlock upon one direction of rotation but will cam by each other by one being resiliently mounted when rotation in the opposite direction is attempted.

With reference to the drawings, 10 designates a tubular body which has a member 11 rotatably mounted at one end thereof. This member has a handle 12 fixed thereto and also a pointer 13 which will move over a scale 14 mounted on the portion 15 of the body. A bushing 16 serves as a bearing for this member 11 while a thrust ball bearing 17 is provided between a shoulder 18, carried by the member 11, and a portion of the body.

At the opposite end of the body 10, I provide a member 20 reduced as at 21 (see Fig. 3) to provide a shoulder 22 to engage the end of the body where it is held by a pin 23.

The opposite end of the member 20 is reduced as at 37 and the disc 35 is notched as at 38 and abutted against the end of this reduced portion 37 while solder 39 is placed in the notches 38 so as to attach this disc 35 to the end of this member 20. This disc 35 is slit and bent to provide teeth 36. This member 20 has an axial bore 24 for receiving one end 25 of a tool holder. The opposite end of this tool holder is recessed at 26 for the reception of a tool 27 which may be locked therein by a key 28. A spring 29 extends into the bore 30 of this holder 25 and reacts with the end 30' of the bore 24 so as to urge the tool holder axially. A disc 31 slit and bent so as to provide a plurality of teeth 32 is fixedly mounted on the tool holder.

A cup 33 is fitted over the tool holding end of the tool holder and secured by set screw 34 to the member 20. This cup embraces the two toothed discs and also serves as a means for limiting the axial movement of the tool holding member under the influence of the spring 29.

The handle 12 and its rotary mounting 11 is connected to the body through resilient springs 40 which are in spaced relation. These springs are so arranged that when little or no resistance is encountered in turning the work, the body will be moved in the same amount that the handle is moved. However, when resistance is encountered, then the handle will rotate relative to the body and by reason of the scale and pointer will indicate the amount of torque which is being applied to the tool.

In use, the tool 27, which in this case is a screw driver, is inserted in the slot of a screw and pressure is applied on the handle to move the toothed discs axially into engagement with each other so as to provide a driving connection between the handle and the body, the arrangement being such that up to a certain point the handle will drive the body but when a sufficient resistance is provided to torsionally strain the spring 40 then the pointer 13 will move over the scale 14 to indicate in inch pounds the torque which is being applied. By reason of the ratchet arrangement the scale may be always uppermost so as to be viewed by the operator. Also, by reason of the ratchet, the hand of the operator need not be released from the handle, which is desirable in many instances when considerable rotation of a screw is desired. The screw driver also may always remain in the slot of the screw which is being operated upon.

I claim:

1. A tool comprising an elongated body, a handle at one end of said body mounted for rotation about the longitudinal axis thereof, resilient means connecting said handle to said body to yieldingly resist relative rotation of the handle and body, a scale and pointer, one attached to move with the body and the other mounted to move with the handle whereby upon relative rotation of the body and handle one moves with reference to the other to indicate the torque applied, an implement holder rotatably mounted relative to the body at the other end thereof, ratchet means between said holder and body to drive the holder in one direction while permitting slip in the other direction of rotation, whereby the scale and pointer may be maintained in a desired position to be viewed.

2. A tool of the character described in claim 1 wherein said ratchet comprises a pair of discs with portions offset to provide teeth for interengagement in one direction of relative rotation.

3. A tool of the character described in claim 1 wherein said ratchet comprises a pair of discs with portions offset to provide teeth for interengagement in one direction of rotation and one of said discs is resiliently mounted with reference to the other to permit relative axial movement when the discs are relatively rotated in the other direction.

RALPH E. BOOTH.

REFERENCES CITED

The following references are of record in the file of this patent:

UNITED STATES PATENTS

| Number | Name | Date |
|---|---|---|
| 2,159,354 | Dunn | May 23, 1939 |
| 2,410,971 | Hartley | Nov. 12, 1946 |
| 2,417,402 | Storrie | Mar. 11, 1947 |